US012696228B2

(12) United States Patent
Takla et al.

(10) Patent No.: US 12,696,228 B2
(45) Date of Patent: Jul. 28, 2026

(54) SYSTEMS AND METHODS FOR HYPER-PRECISE TIME OPERATIONS

(71) Applicant: VERIZON PATENT AND LICENSING INC., Basking Ridge, NJ (US)

(72) Inventors: Mourad B. Takla, Hillsborough, NJ (US); Weimin Liu, Chatham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 323 days.

(21) Appl. No.: 18/524,819

(22) Filed: Nov. 30, 2023

(65) Prior Publication Data

US 2025/0184943 A1     Jun. 5, 2025

(51) Int. Cl.
*H04W 64/00*        (2009.01)
*G04R 20/04*        (2013.01)
*H04W 56/00*        (2009.01)

(52) U.S. Cl.
CPC ............ *H04W 64/00* (2013.01); *G04R 20/04* (2013.01); *H04W 56/001* (2013.01)

(58) Field of Classification Search
CPC ..... H04W 64/00; H04W 56/001; G04R 20/04
See application file for complete search history.

(56) References Cited

U.S. PATENT DOCUMENTS

| | | | |
|---|---|---|---|
| 2018/0192233 A1* | 7/2018 | Del Regno | ........... G01S 19/071 |
| 2019/0154837 A1* | 5/2019 | Noble | ...................... G01S 19/06 |
| 2022/0252732 A1* | 8/2022 | Dai | ........................ G01S 19/073 |
| 2024/0094413 A1* | 3/2024 | Park | ................... H04W 64/003 |
| 2024/0337757 A1* | 10/2024 | Rao | ......................... G01S 19/41 |

* cited by examiner

*Primary Examiner* — Kenneth T Lam

(57) ABSTRACT

Disclosed are systems and methods for a computerized Hyper-precise time (HPT) framework that accurately and efficiently provides precise time data for all sorts of network-based and local operations. The disclosed HPT framework can, among other benefits, provide sub-nanosecond time accuracy for operations involving, but not limited to, precise positioning, ambiguity resolution, mitigation of signal delays, maintaining continuous and accurate tracking for dynamic applications, improved convergence for accurate solutions, and the like. The framework can be utilized for Real-Time Kinematic (RTK), such that the determined HPT can directly contribute to achieving the high levels of accuracy and reliability required in RTK applications.

20 Claims, 9 Drawing Sheets

300

302 — Determine initial coordinates of a receiver and corresponding time offset

304 — Perform ambiguity resolutions

306 — Determine coefficients for correction modelling

308 — Generate a Virtual Reference Station (VRS)

310 — Perform a time correction operation(s)

312 — Perform an executable operation on a network based on determined HPT

302 — Determine initial coordinates of a receiver and corresponding time offset

304 — Perform ambiguity resolutions

306 — Determine coefficients for correction modelling

308 — Generate a Virtual Reference Station (VRS)

310 — Perform a time correction operation(s)

312 — Perform an executable operation on a network based on determined HPT

300

310

320 — Compute the VRS for position correction and time correction

322 — Communicate computed VRS to the receiver

324 — Preform position and time estimate corrections

310

330 — Determine an estimated position of the receiver

332 — Determine a time offset of the receiver

334 — Determine an initial estimated range to a set of satellites

336 — Update a hyper-precise position of the receiver

338 — Perform a geometric computation of a distance correction

340 — Determine an updated time offset

342 — Update the time offset based on the update

310

350  Identify carrier phase ambiguities

352  Resolve carrier phase ambiguities

354  Derive VRS observations

356  Perform position and time estimate corrections

310

360 Identify measurements from each station to the receiver

362 Determine a closest proximity of the receiver to the stations

364 Perform modelling and interpolation based on the coordinate measurements of the station with the closest proximity

SYSTEMS AND METHODS FOR HYPER-PRECISE TIME OPERATIONS

BACKGROUND INFORMATION

Hyper-precise time (HPT) has critical applications in various fields that include, for example, global navigation systems (GPS, GNSS, for example), telecommunications, communication networks, smart grids, power grid synchronization, cybersecurity, space exploration, and the like.

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

HPT is fundamental in diverse fields, contributing to increased efficiency, accuracy and reliability in critical processes and systems. The need for such precision in timing arises from the requirements of modern technology and applications that demand accurate synchronization and coordination. In some embodiments, such precision may be according to Global Positioning System (GPS) time (GPST).

Currently existing time accuracy methods include, for example, optical clocks, international atomic time (TAI), coordinated universal time (UTC), and the like. However, each system has their drawbacks, including frequent coordination and adjustments, the use of leap seconds therein, and the reliance on synchronization with the Earth's rotation, among others. The complexity and sensitivity of these existing mechanisms reveal that there is a need for an improved framework that accurately and efficiently provides precise time data for all sorts of network-based and local operations.

According to some embodiments, the disclosed systems and methods provide an HPT framework that can, among other benefits, provide sub-nanosecond time accuracy. In some embodiments, as discussed herein, the disclosed framework can operate to provide HPT with Real-Time Kinematic (RTK). As discussed herein, the disclosed HPT framework can provide precise positioning, ambiguity resolution, mitigation of signal delays, maintaining continuous and accurate tracking for dynamic applications, improved convergence for accurate solutions, and the like. The disclosed framework directly contributes to achieving the high levels of accuracy and reliability required in applications where precise positioning is essential.

Figure 1:
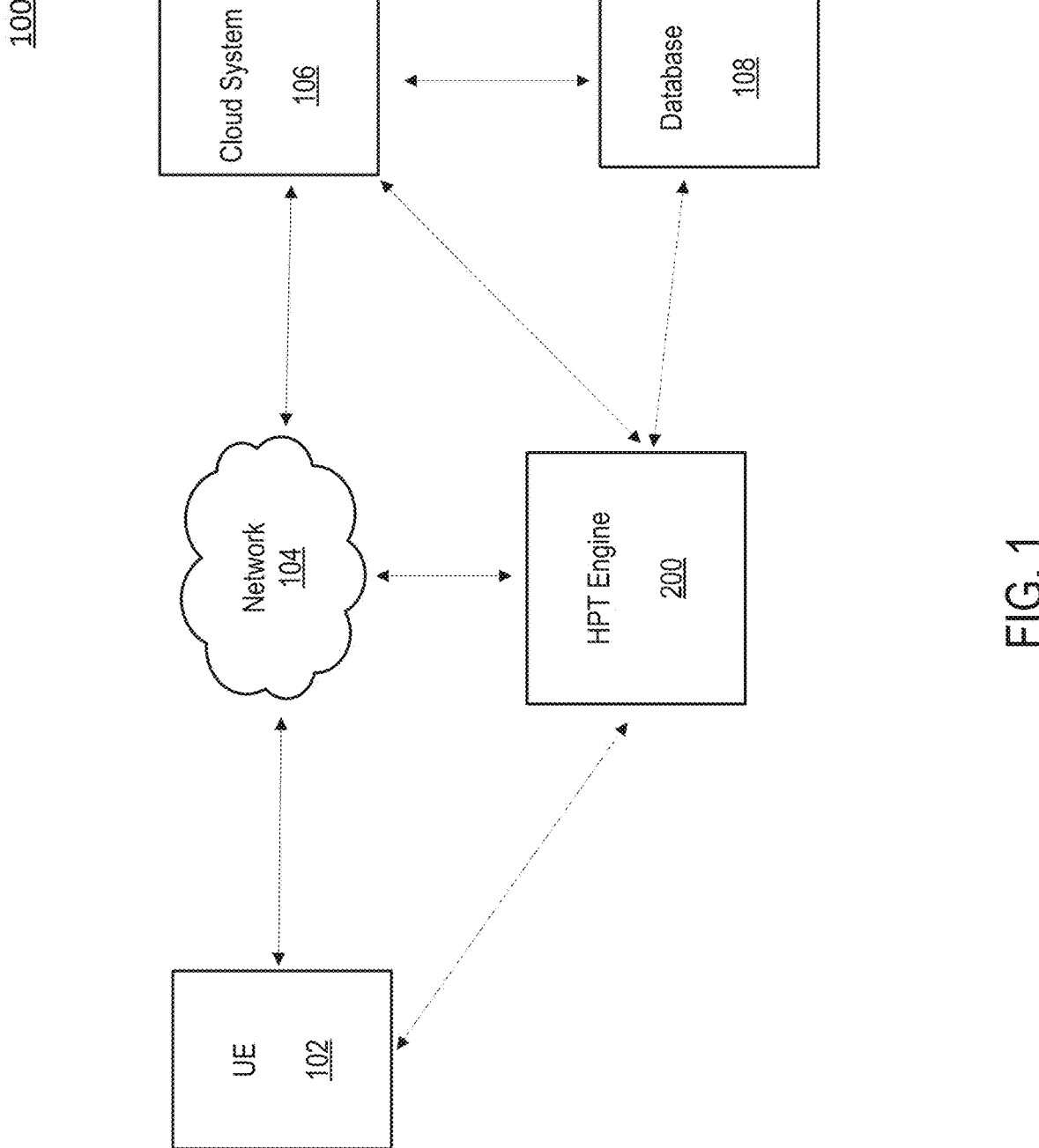
FIG. 1 is a block diagram of an example network architecture according to some embodiments of the present disclosure.

With reference to FIG. 1, system 100 is depicted which includes user equipment (UE) 102 (e.g., a client device, as mentioned above and discussed below in relation to FIG. 5), network 104, cloud system 106, database 108, and HPT engine 200. It should be understood that while system 100 is depicted as including such components, it should not be construed as limiting, as one of ordinary skill in the art would readily understand that varying numbers of UEs, engines, cloud systems, databases and networks can be utilized; however, for purposes of explanation, system 100 is discussed in relation to the example depiction in FIG. 1.

According to some embodiments, UE 102 can be any type of swarm device, as discussed above. For example, UE 102 can include, but not be limited to, a mobile phone, tablet, laptop, game console, smart television (TV), Internet of Things (IoT) device, wearable device, an autonomous vehicle (AV), autonomous machine, unmanned aerial vehicle (UAV), and/or any other device equipped with a cellular or wireless or wired transceiver. In some embodiments, UE 102 can be a receiver, as discussed below.

In some embodiments, network 104 can be any type of network, such as, but not limited to, a wireless network, cellular network, the Internet, and the like (as discussed above). Network 104 facilitates connectivity of the components of system 100, as illustrated in FIG. 1. Further discussion of embodiments of network 104 are provided below with reference to FIG. 4.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a cellular provider—Verizon®, which has associated network resources hosted on the internet or private network (e.g., network 104), which enables (via engine 200) the hyper-precise time operations discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102 and the services and applications provided by cloud system 106 and/or engine 200).

In some embodiments, for example, cloud system 106 can provide a private/proprietary management platform, whereby HPT engine 200, discussed infra, corresponds to the novel functionality system 106 enables, hosts and provides to a network 104 and other devices/platforms operating thereon.

According to some embodiments, database 108 may correspond to a data storage for a platform (e.g., a network hosted platform, such as cloud system 106, as discussed supra) or a plurality of platforms. Database 108 may receive storage instructions/requests from, for example, HPT engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

HPT engine 200, as discussed above and further below in more detail, can include components for the disclosed functionality. According to some embodiments, HPT engine 200 may be a special purpose machine or processor, and can be hosted by a device on network 104, within cloud system 106 and/or on UE 102. In some embodiments, HPT engine 200 may be hosted by a server and/or set of servers associated with cloud system 106.

According to some embodiments, as discussed in more detail below, HPT engine 200 may be configured to implement and/or control a plurality of services and/or microservices, where each of the plurality of services/microservices are configured to execute a plurality of workflows associated with performing the disclosed connection management. Non-limiting embodiments of such workflows are provided below in relation to at least FIGS. 3A-3E.

According to some embodiments, as discussed above, HPT engine 200 may function as an application provided by and/or hosted by cloud system 106. In some embodiments, HPT engine 200 may function as an application installed on a server(s), network location and/or other type of network resource associated with system 106. In some embodiments, HPT engine 200 may function as an application installed and/or executing on UE 102. In some embodiments, such application may be a web-based application accessed by UE 102. In some embodiments, HPT engine 200 may be configured and/or installed as an augmenting script, program or application (e.g., a plug-in or extension) to another application or program provided by cloud system 106 and/or executing on UE 102.

Figure 2:
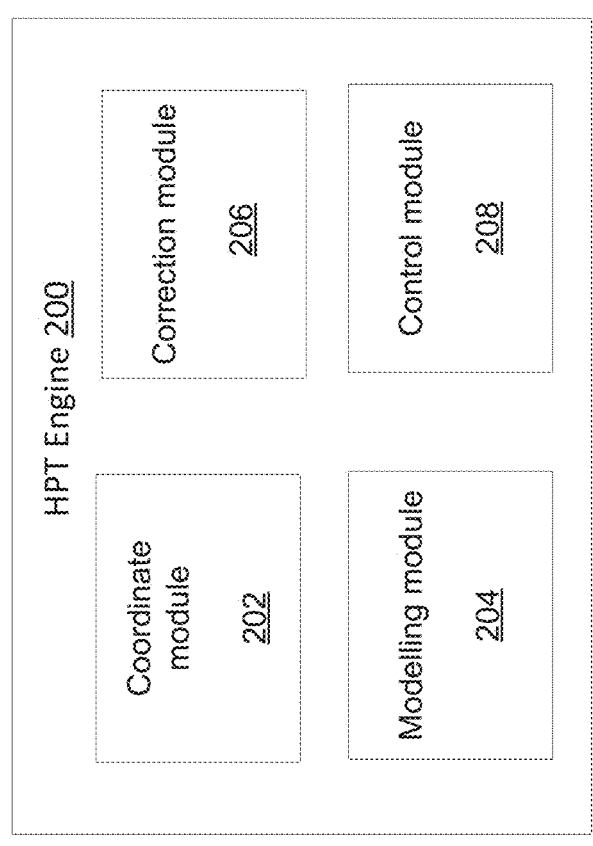
FIG. 2 is a block diagram illustrating components of an exemplary system according to some embodiments of the present disclosure.

As illustrated in FIG. 2, according to some embodiments, HPT engine 200 includes coordinate module 202, modelling module 204, correction module 206 and control module 208. It should be understood that the connection broker(s) and modules discussed herein are non-exhaustive, as additional or fewer brokers and/or modules (or sub-modules) may be applicable to the embodiments of the systems and methods discussed. More detail of the operations, configurations and functionalities of HPT engine 200 and each of its modules, and their role within embodiments of the present disclosure will be discussed below.

Figure 3A:
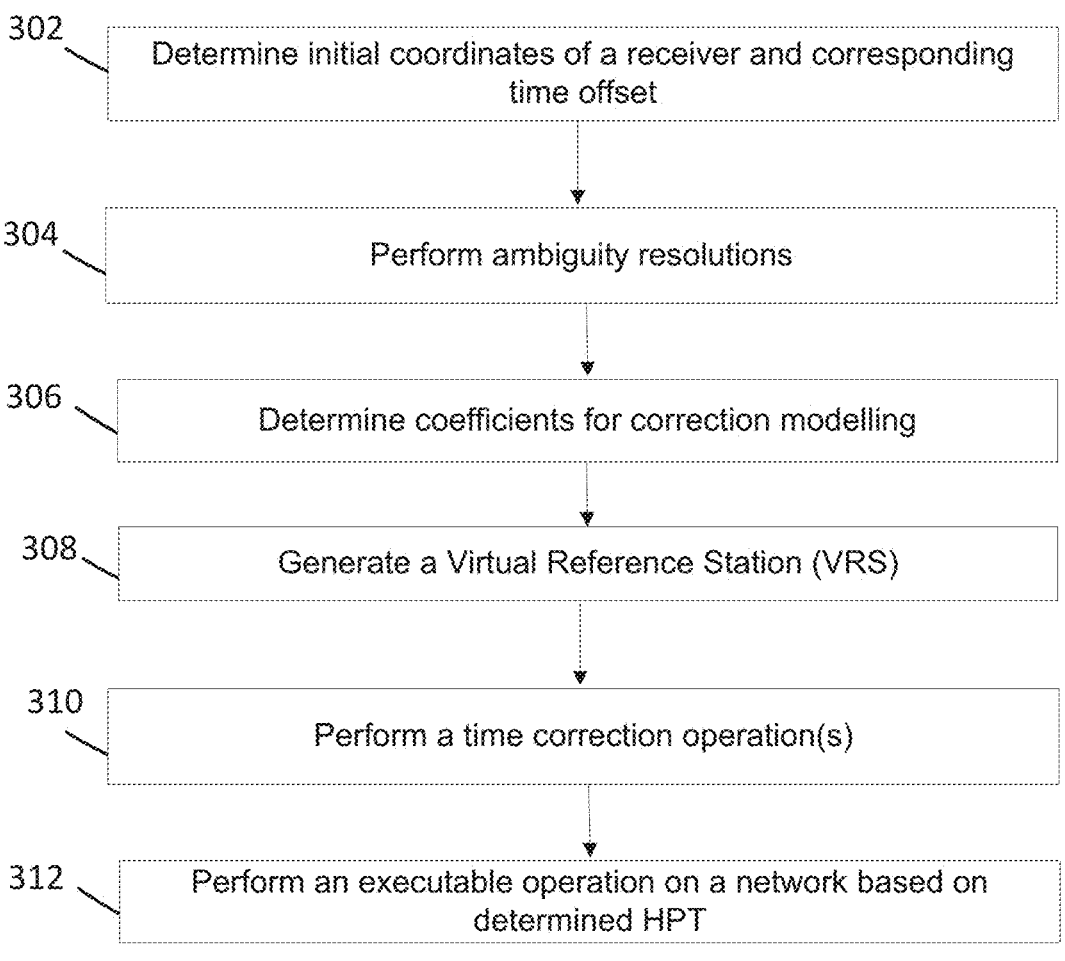
FIGS. 3A-3E illustrate exemplary workflows according to some embodiments of the present disclosure.

In FIG. 3A, Process 300 provides non-limiting example embodiments for determining HPT with RTK. As evidenced from the disclosure herein, the disclosed systems and methods can provide sub-nanosecond accuracy, which is a stark improvement to the existing accuracy of 20~30 nanosecond accuracy of existing systems (e.g., GPS, for example). As discussed herein, the HPT framework's executing with RTK can involve a communication channel between a RTK system or network and a receiver (e.g., a GPS receiver, for example) (referred to as a "rover," interchangeably). In some embodiments, the receiver can be a mobile receiver, and in some embodiments, the receiver can be a fixed receiver. In some embodiments, the RTK infrastructure can include a base station(s), which can be compiled or include reference stations (e.g., master, auxiliary, Virtual Reference Station (VRS)), whereby the collective of the stations can correlate to as a base RTK.

By way of background, according to some embodiments, a general pseudo-range measurement equation is:

$$p = \rho + d_p + C(dt - dT) + d_{ion} + d_{trop} + \epsilon_{mp} + \epsilon_p \qquad (1)$$

where, p: the pseudorange measurement at the receiver;

$\rho$: the true range (e.g., to be estimated by the receiver)

$d_\rho$: satellite orbital error (e.g., broadcast by the satellite in its ephemeris)

C: the speed of light in vacuum (e.g., constant)

dt: satellite clock offset from GPST (e.g., different for and broadcast by each satellite)

dT: receiver clock offset from GPST (e.g., to be estimated by the receiver)

$d_{ion}$: error, as a distance quantity, due to ionospheric delay (e.g., specific to the location of each satellite, 2~5 times greater than tropospheric delay, broadcast by the satellite, and, in some embodiments, estimated by transmitting two or more frequencies);

$d_{trop}$: error due to tropospheric delay (e.g., due to, but not limited to, temperature, pressure, and water vapor above the receiver, at a frequency independent below a threshold value (e.g., 30 GHz), which can changes in time and space, and can degrade GNSS accuracy).

According to some embodiments, some approaches and error magnitudes can be based on, but not limited to:

Ignoring e.g., 2.5~0.5 m;

estimating from surface meteorology, e.g., 0.5~0.2 m;

predicting from climatology, e.g., 0.2~0.07 m;

estimating from other augmentations, e.g., 0.5~0.1 m estimating from carrier phase observables, e.g., 0.025~0.01 m; and/or accounting for alternatives based on weather prediction, RTK, and the like, e.g., 0.05~0.025 m.

As such, in some embodiments, an error can be/involve:

$\epsilon_{mp}$: error introduced by multipath (distortion, reduced by the use of choke ring antenna); and $\epsilon_p$: error due to receiver noise (random)

According to some embodiments, assuming, in a non-limiting manner, a number (e.g., 4) of satellites, a GPS receiver can use measurements related thereto via:

$$p_i = \rho_i + d_{\rho,i} + C(dt_i - dT) + d_{ion,i} + d_{trop} + \epsilon_{mp} + \epsilon_p \qquad (2)$$

where $i \in \{1, 2, 3, 4\}$ are the satellites, and $\rho_i$ is the distance between the position of the GPS receiver's phase center $\{x, y, z\}$ and satellite i.

Alternatively, in some embodiments, Eq. 2 can be written as:

$$dT = dt_i + \frac{-p_i + \rho_i + d_{\rho,i} + d_{ion,i} + d_{trop} + \epsilon_{mp} + \epsilon_p}{C} \qquad (3)$$

In some embodiments, the satellites' locations can be denoted as $\{X_i, Y_i, Z_i\}$, $i \in \{1, 2, 3, 4\}$, and the distances between the satellites and the GPS receiver's phase center are $$\rho_i = \sqrt{(X_i - x)^2 + (Y_i - y)^2 + (Z_i - z)^2}, \text{ for } i \in \{1, 2, 3, 4\}, \qquad (4)$$

where, the four (4) pseudo-range measurements $p_1, p_2, p_3, p_4$ can be used to solve for the four (4) unknowns: the receiver position $\{x, y, z\}$ and time offset dT.

Accordingly, as discussed herein, the disclosed framework can utilize the RTK infrastructure (e.g., either single base or network type) to correct time in addition to correcting coordinates.

According to some embodiments, Step 302 of Process 300 can be performed by coordinate module 202 of HPT engine 200; Steps 304-308 can be performed by modelling module 204; Step 310 can be performed by correction module 204; and Step 312 can be performed by control module 312.

According to some embodiments, Process 300 begins with Step 302 where initial coordinates of a receiver and a corresponding time offset can be determined. In some embodiments, for example, the receiver (or rover) can send its initial, estimated coordinates $\{x_0, y_0, z_0\}$ to an RTK network or reference station. According to some embodiments, upon such coordinate communication, a time offset from GPST $dT_0$ can be determined, which can be determined at a time proximate the coordinate determination.

In Step 304, engine 200 can execute operations to perform ambiguity resolutions, which in some embodiments can be similar to those performed for RTK. According to some embodiments, the ambiguity resolutions may be based on, but not limited to, International GPS Service (IGS) predicted satellite ephemerides, ionospheric corrections, tropospheric corrections, carrier phase multipath corrections, historical network data, antenna phase center corrections, and the like, or some combination thereof. Accordingly, Step 304 can involve resolution of the integer ambiguities of the coordinate measurements and offsets, which can include algorithms, methodologies and/or techniques such as, but not limited to, LAMBDA, Integer Least Square (ILS), Fixed-Lag Smoothing, and the like.

In Step 306, engine 200 can utilize estimates from the ambiguity resolutions in order to determine coefficients for correction modelling (and interpolation). For example, the coefficients can be between $-1$ and $0$, which can be based on the ambiguity resolution of the coordinates and offset, as discussed supra. In some embodiments, the correction modelling can be performed for each reference station.

According to some embodiments, the correction modelling of Step 306 can be performed via any known or to be known modelling and/or interpolation algorithm, such as, but not limited to, differential correction modelling (e.g., Differential Global Navigation Satellite System (DGNSS), Satellite-Based Augmentation System (SBAS), tropospheric correction models, Ionospheric correction models, orbit bias models, multipath mitigation, linear interpolation, bicubic interpolation, Kalman filtering, inertial navigation integration, and the like.

In Step 308, engine 200 determines information related to a positional location for the receiver, which can be based on, but not limited to, the coordinates and resolutions (from Steps 302-304), which can be input into the modelling (from Step 306). Accordingly, in some embodiments, Step 308 can result in the generation of a VRS, which can be proximate to the reported receiver coordinates (as per the resolutions and correction coefficients, discussed supra). In some embodiments, the VRS can enable reference observations to be compiled as a virtual shift from the receiver/rover site.

In Step 310, engine 200 can perform a time correction operation(s) for the receiver. According to some embodiments, engine 200 can execute a variety of four (4) separate methods to perform Step 310. Accordingly, each separate method is provided in FIGS. 3B-3E, respectively.

Figure 3B:
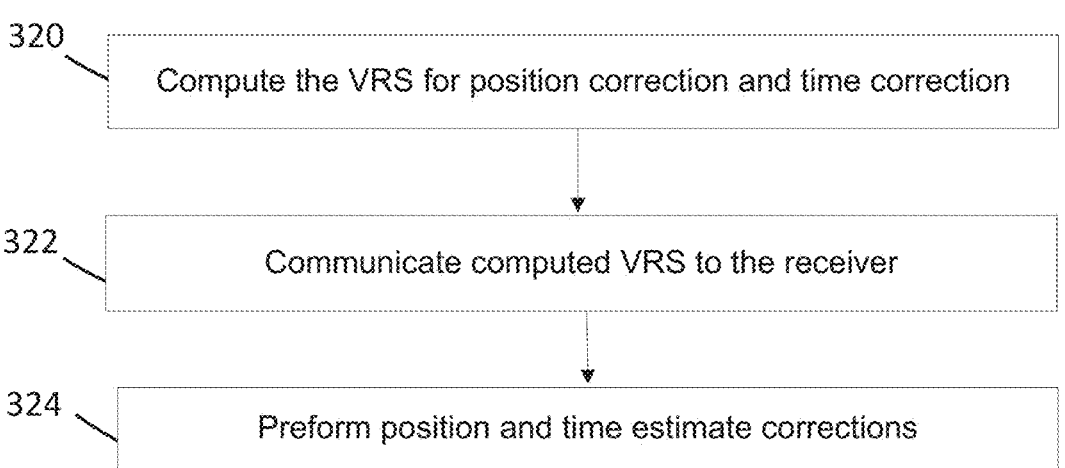

Turning to FIG. 3B, with regard to a first (1) method, a change to the RTK infrastructure can be implemented. That is, as in Step 320, based on the receiver's approximate position $\{x_0, y_0, z_0\}$ (from Step 302), engine 200 can compute the VRS for position correction $\{\Delta x, \Delta y, \Delta z\}$ and time correction $\Delta dT$. In Step 322, in some embodiments, engine 200 can send such information (e.g., $\{\Delta x, \Delta y, \Delta z\}$ and $\Delta dT$) to the receiver, whereby, in Step 324 the receiver can use the information to correct its position and time estimates:

$$\{\hat{x}, \hat{y}, \hat{z}\} = \{x_0 + \Delta x, y_0 + \Delta y, z_0 + \Delta z\} \tag{5}$$

$$\widehat{dT} = dT_0 + \Delta dT \tag{6}$$

where the circumflex ^ signifies the new, hyper-precise time estimate.

Figure 3C:
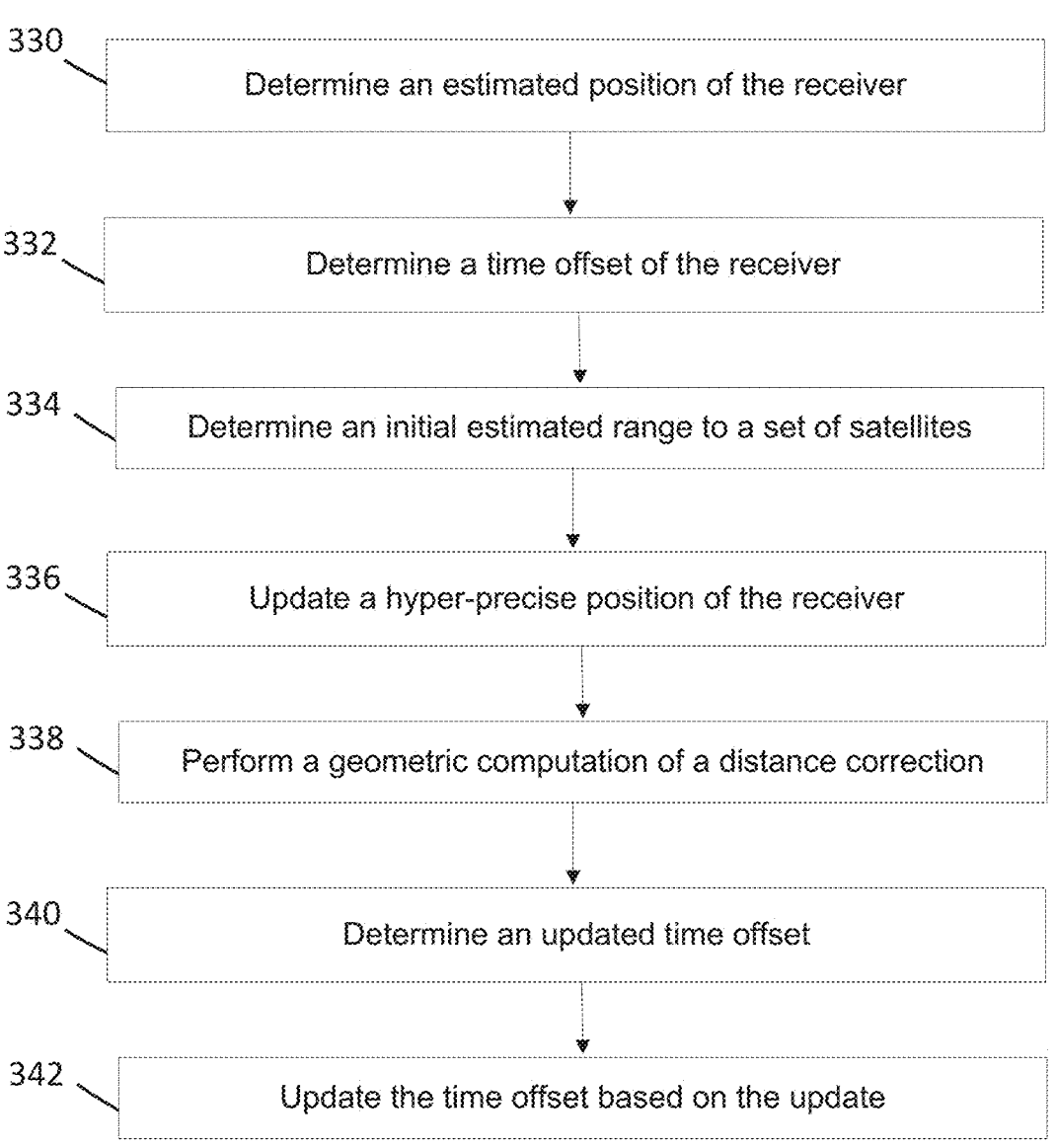

Turning to FIG. 3C, with regard to a second (2) method, the RTK base (e.g., network) does not change its model of operation and can send the position correction $\{\Delta x, \Delta y, \Delta z\}$ to the receiver, as in Step 330. The receiver can then use that position correction to adjust its position estimate and its time offset, as in Step 332. The instant method does not require a change to the RTK infrastructure, and the receiver.

According to some embodiments, before correction, the estimated position of the receiver can be determined to be $\{x_0, y_0, z_0\}$ (as in Step 330), its time offset from GPST can be determined to be $dT_0$ (as discussed supra and in Step 332), and, in Step 334, the initial estimated range to satellite $i \in \{1, 2, 3, 4\}$ to be:

$$\rho_{i,0} = \sqrt{(X_i - x_0)^2 + (Y_i - y_0)^2 + (Z_i - z_0)^2} \tag{7}$$

In some embodiments, in Step 336, based on the position correction $\{\Delta x, \Delta y, \Delta z\}$, the receiver updates its hyper-precise position to be $$\{\hat{x}, \hat{y}, \hat{z}\} = \{x_0 + \Delta x, y_0 + \Delta y, z_0 + \Delta z\} \tag{8}$$

Then, in Step 338, the receiver can perform a geometric computation of its distance correction $\Delta \rho_i$ to at least one of the satellites $i \in \{1, 2, 3, 4\}$:

$$\hat{\rho}_i = \sqrt{(X_i - \hat{x})^2 + (Y_i - \hat{y})^2 + (Z_i - \hat{z})^2} \tag{9}$$

$$\Delta \rho_i = \hat{\rho}_i - \rho_{i,0} \tag{10}$$

Since $$dT_0 = dt_i + \frac{-p_i + \rho_{i,0} + d_{\rho,i} + d_{ion,i} + d_{trop}}{C} \tag{11}$$

In Step 340, the updated time offset estimate can be:

$$\widehat{dT} = dt_i + \frac{-p_i + \hat{\rho}_i + d_{\rho,i} + d_{ion,i} + d_{trop}}{C} = \tag{12}$$

$$dt_i + \frac{-p_i + \rho_{i,0} + \Delta \rho_i + d_{\rho,i} + d_{ion,i} + d_{trop}}{C}$$

Therefore, in Step 342, the receiver can update its time offset by the amount of $\Delta dT$:

$$\Delta dT = \widehat{dT} - dT_0 = \frac{-\Delta \rho_i}{C} \tag{13}$$

From the Eq. 13, the receiver can update its time offset estimate based on $\Delta\rho_i$ from any satellite i. In some embodiments, the receiver can use an average from multiple satellites to reduce errors due to distortion and receiver noise.

Figure 3D:
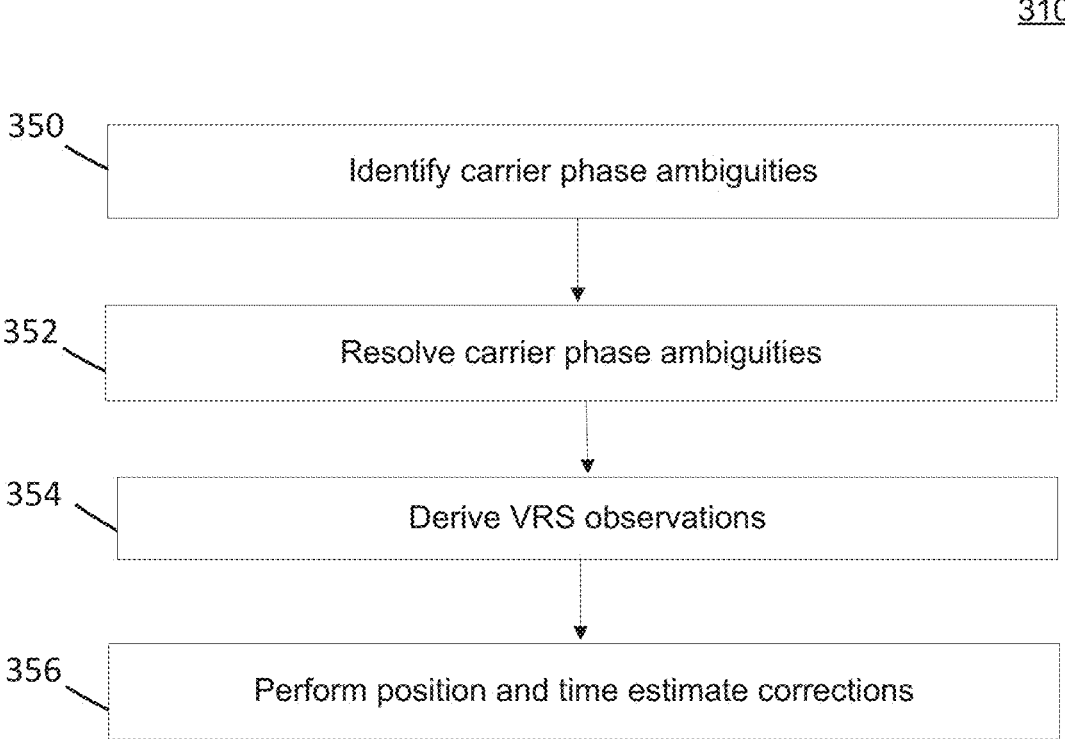

Turning to FIG. 3D, with regard to a third (3) method, which can be utilized for types of RTK networks that send specific measurement corrections (e.g., satellite ephemerides, ionospheric, tropospheric, carrier phase data) to the receiver, engine 200 can identify and resolve the carrier phase ambiguities, derive VRS observations, correct its position estimate and correct its time estimate. The third method can utilize the mechanism of the first method for the types of RTK networks for such specific corrections.

In some embodiments, FIG. 3D can involve the performance of Steps 350-356. In Step 350, engine 200 can identify carrier phase ambiguities within a GNSS system for which an RTK network is operating. In Step 352, engine 200 can execute any type of known or to be known technique or algorithm to resolve the ambiguities, such as, but not limited to, multiple parallel paths, global optimization, ranked parsing lists, double differencing, integer ambiguity resolution (IAR) (e.g., LAMBDA), and the like. Accordingly, engine 200 can perform the similar mechanisms as discussed above at least with reference to Step 304, supra.

In Step 354, engine 200 can derive VRS observations, which can be performed in a similar manner as discussed above. Then, in Step 356, engine 200 can then perform the position and time estimate corrections, which can be performed in a similar manner as discussed above.

Figure 3E:
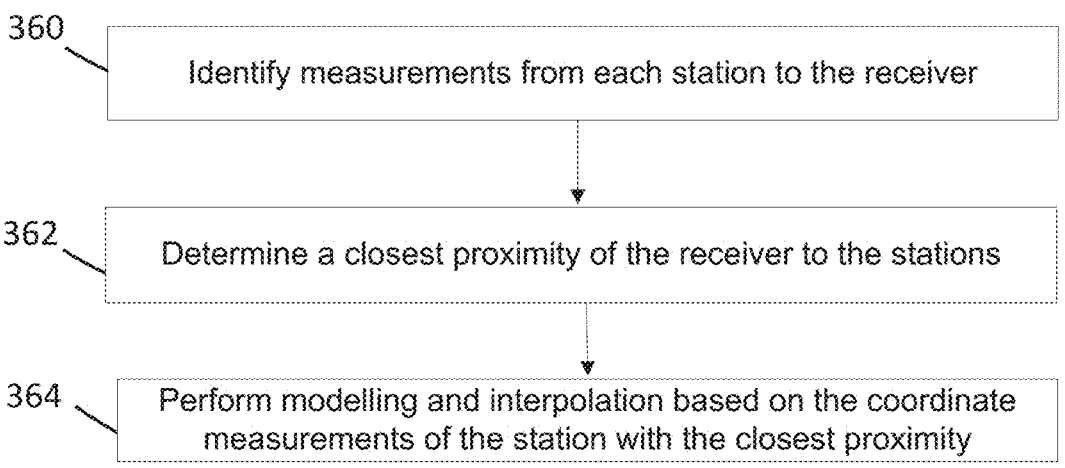

And, in FIG. 3E, with regard to a fourth (4) method, engine 200 can identify measurement for each station (e.g.,—master, auxiliary and VRS stations), as in Step 360. Then, in Step 362, engine 200 can determine differences between measurements from the station closest to the receiver (e.g., determine which station—master, auxiliary or VRS is closest to the receiver). Accordingly, in Step 364, engine 200 can perform the modelling and interpolation discussed above based on that station's coordinate measurements.

Thus, in Step 310, as per each methodology disclosed within FIGS. 3B-3E, HPT can be determined and stored (in database 108). Therefore, turning back to FIG. 3A, the determined HPT can be utilized to perform specifically requested operations and/or functionality, as in Step 312. As discussed above, for example, HPT can be used in navigation systems, financial transactions, communication networks, power grid management, medical applications, transportation systems, and the like.

Accordingly, the determined and leveraged HPT can contribute to increased efficiency, accuracy and reliability in critical processes and systems of modern technologies that demand accurate synchronization and coordination.

Figure 4:
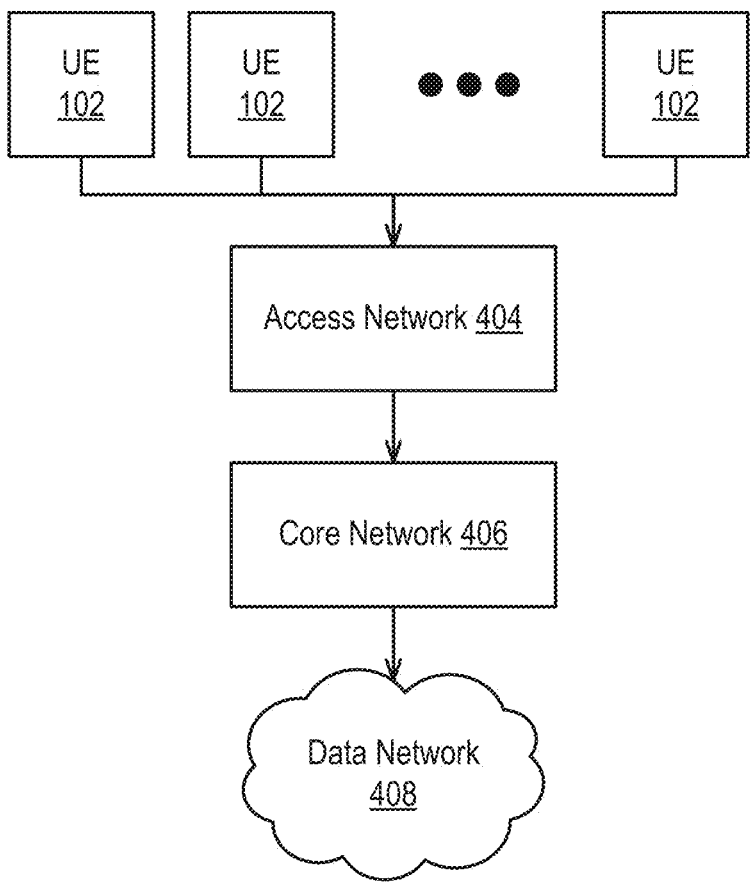
FIG. 4 illustrates a non-limiting example embodiment of a network architecture according to some embodiments of the present disclosure.

FIG. 4 is a block diagram of an example network architecture according to some embodiments of the present disclosure. In the illustrated embodiment, UE 102 accesses a data network 408 via an access network 404 and a core network 406.

In the illustrated embodiment, the access network 404 comprises a network allowing network communication with UE 102. In general, the access network 404 includes at least one base station that is communicatively coupled to the core network 406 and coupled to zero or more UE 102.

In some embodiments, the access network 404 comprises a cellular access network, for example, a 5G network. In an embodiment, the access network 404 can include a NextGen Radio Access Network (NG-RAN). In an embodiment, the access network 404 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 404 provides access to a core network 406 to UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 406 and to external network-attached elements in a data network 408 such as the Internet.

In the illustrated embodiment, the access network 404 and the core network 406 are operated by a NO. However, in some embodiments, the networks (404, 406) may be operated by a private entity and may be closed to public traffic. For example, the components of the network 406 may be provided as a single device, and the access network 404 may comprise a small form-factor base station. In these embodiments, the operator of the device can simulate a cellular network, and UE 102 can connect to this network similar to connecting to a national or regional network.

In some embodiments, the access network 404, core network 406 and data network 408 can be configured as a MEC network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

Figure 5:
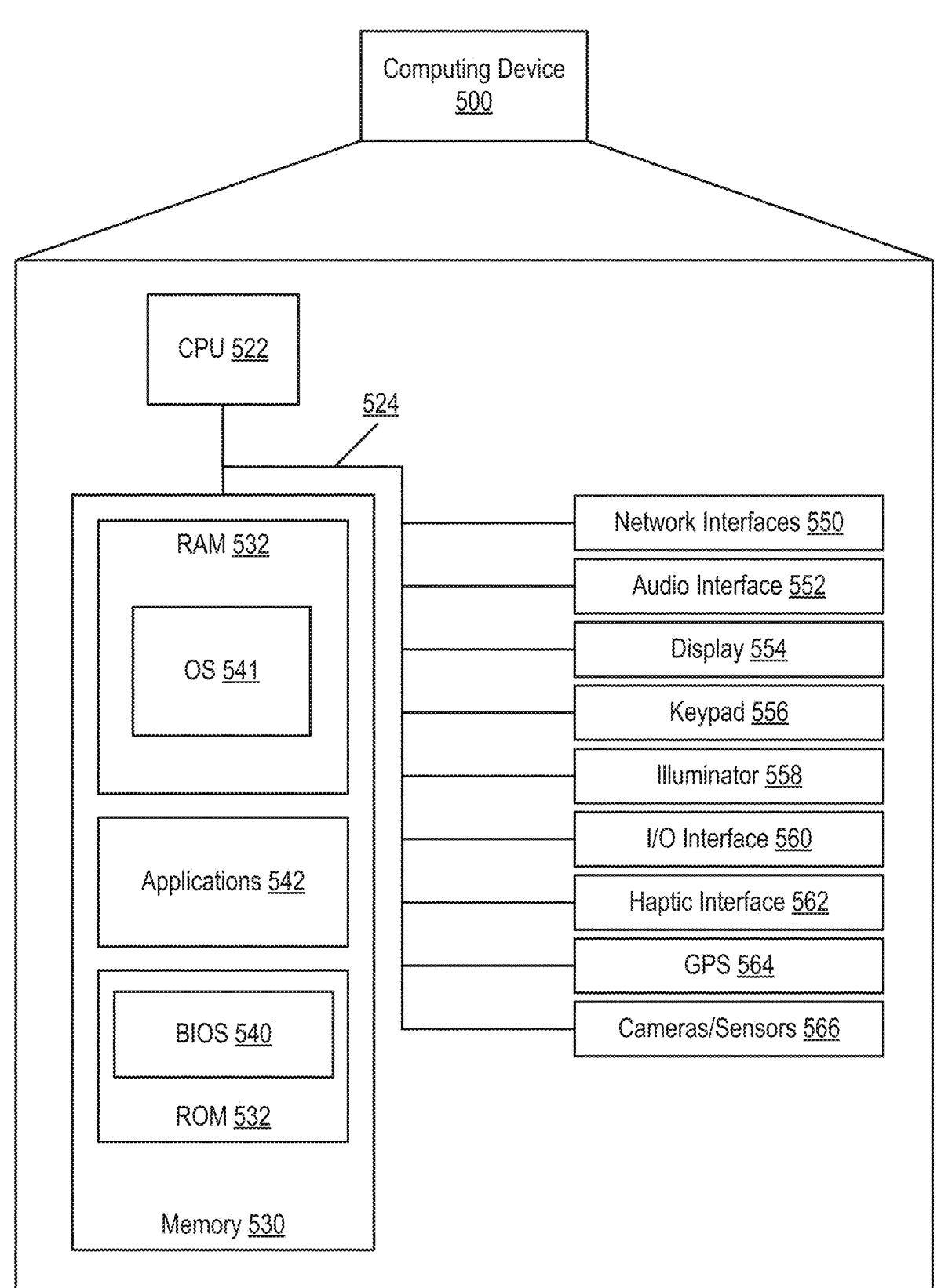
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a CPU 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/ sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   determining, over a Real-Time Kinematic (RTK) network, information related to a receiver, the receiver information comprising initial coordinates of the receiver and a receiver time offset;
   executing ambiguity resolutions based on the receiver information;
   executing a correction model based on the receiver information and ambiguity resolutions, wherein the execution of the correction model is based on estimated coefficients that are related to the ambiguity resolution of the receiver information;
   generating, on the RTK network, based on the correction modelling, a Virtual Reference Station (VRS); and
   determining, based on information related to the VRS, hyper-precise time (HPT) in relation to the receiver, the HPT enabling accurate execution of computer-executable instructions by user equipment (UE).

2. The method of claim 1, further comprising:
   computing, based on the initial coordinates of the receiver, a position correction and a time correction for the VRS; and
   correcting a position estimate and a time estimate for the receiver based on the computed position correction and time correction of the VRS, wherein the HPT is determined based on the correction of the position and time estimates for the receiver.

3. The method of claim 1, wherein the RTK network further comprises a set of satellites, wherein a position of the receiver is based on positions of the set of satellites.

4. The method of claim 3, further comprising:
   determining a range from the receiver to each satellite in the set of satellites;
   determining, based on the range, a position correction for the receiver;
   performing a distance correction for the range based on the determined position correction; and
   determining an updated receiver time offset based on the distance correction, wherein the HPT is determined based on the updated receiver time offset.

5. The method of claim 4, wherein the updated receiver time offset is based on an average of the range from the receiver to each satellite in the set of satellites.

6. The method of claim 1, further comprising:
   performing measurement corrections for the receiver related to satellite ephemerides, ionospheric, tropospheric and carrier phase data, wherein the HPT is determined based on the measurement corrections.

7. The method of claim 1, further comprising:
   determining differences in distances between the receiver and a station of the RTK network;
   determining a closest station based on the determined differences in distances; and
   performing the correction modelling based on coordinate measurements of the closest station, wherein the HPT is determined based on the performed correction modelling.

8. The method of claim 1, wherein the correction model corresponds to at least one of a tropospheric correction, ionospheric correction and orbit correction of a satellite.

9. The method of claim 1, wherein the receiver time offset is an offset from Global Positioning System (GPS) time (GPST).

10. The method of claim 1, wherein the RTK network comprises a RTK base station, wherein the RTK base station is associated with a master station, auxiliary station and the VRS.

11. A network device comprising:
   a processor configured to:
      determine, over a Real-Time Kinematic (RTK) network, information related to a receiver, the receiver information comprising initial coordinates of the receiver and a receiver time offset;
      execute ambiguity resolutions based on the receiver information;
      execute a correction model based on the receiver information and ambiguity resolutions, wherein the execution of the correction model is based on estimated coefficients that are related to the ambiguity resolution of the receiver information;
      generate, on the RTK network, based on the correction modelling, a Virtual Reference Station (VRS); and determine, based on information related to the VRS, hyper-precise time (HPT) in relation to the receiver, the HPT enabling accurate execution of computer-executable instructions by user equipment (UE).

12. The network device of claim 11, wherein the processor is further configured to:

compute, based on the initial coordinates of the receiver, a position correction and a time correction for the VRS; and correct a position estimate and a time estimate for the receiver based on the computed position correction and time correction of the VRS, wherein the HPT is determined based on the correction of the position and time estimates for the receiver.

13. The network device of claim 11, wherein the processor is further configured to:

determine a range from the receiver to a set of satellites on the RTK network;

determine, based on the range, a position correction for the receiver;

perform a distance correction for the range based on the determined position correction; and determine an updated receiver time offset based on the distance correction, wherein the HPT is determined based on the updated receiver time offset.

14. The network device of claim 11, wherein the processor is further configured to:

perform measurement corrections for the receiver related to satellite ephemerides, ionospheric, tropospheric and carrier phase data, wherein the HPT is determined based on the measurement corrections.

15. The network device of claim 11, wherein the processor is further configured to:

determine differences in distances between the receiver and a station of the RTK network;

determine a closest station based on the determined differences in distances; and perform the correction modelling based on coordinate measurements of the closest station, wherein the HPT is determined based on the performed correction modelling.

16. A non-transitory computer-readable storage medium storing instructions, executable by a network device, wherein the instructions are configured to:

determine, over a Real-Time Kinematic (RTK) network, information related to a receiver, the receiver information comprising initial coordinates of the receiver and a receiver time offset;

execute ambiguity resolutions based on the receiver information;

execute a correction model based on the receiver information and ambiguity resolutions, wherein the execution of the correction model is based on estimated coefficients that are related to the ambiguity resolution of the receiver information;

generate, on the RTK network, based on the correction modelling, a Virtual Reference Station (VRS); and determine, based on information related to the VRS, hyper-precise time (HPT) in relation to the receiver, the HPT enabling accurate execution of computer-executable instructions by user equipment (UE).

17. The non-transitory computer-readable storage medium of claim 16, wherein the instructions are further configured to:

compute, based on the initial coordinates of the receiver, a position correction and a time correction for the VRS; and correct a position estimate and a time estimate for the receiver based on the computed position correction and time correction of the VRS, wherein the HPT is determined based on the correction of the position and time estimates for the receiver.

18. The non-transitory computer-readable storage medium of claim 16, wherein the instructions are further configured to:

determine a range from the receiver to a set of satellites on the RTK network;

determine, based on the range, a position correction for the receiver;

perform a distance correction for the range based on the determined position correction; and determine an updated receiver time offset based on the distance correction, wherein the HPT is determined based on the updated receiver time offset.

19. The non-transitory computer-readable storage medium of claim 16, wherein the instructions are further configured to:

perform measurement corrections for the receiver related to satellite ephemerides, ionospheric, tropospheric and carrier phase data, wherein the HPT is determined based on the measurement corrections.

20. The non-transitory computer-readable storage medium of claim 16, wherein the instructions are further configured to:

determine differences in distances between the receiver and a station of the RTK network;

determine a closest station based on the determined differences in distances; and perform the correction modelling based on coordinate measurements of the closest station, wherein the HPT is determined based on the performed correction modelling.

* * * * *